Figure 1:
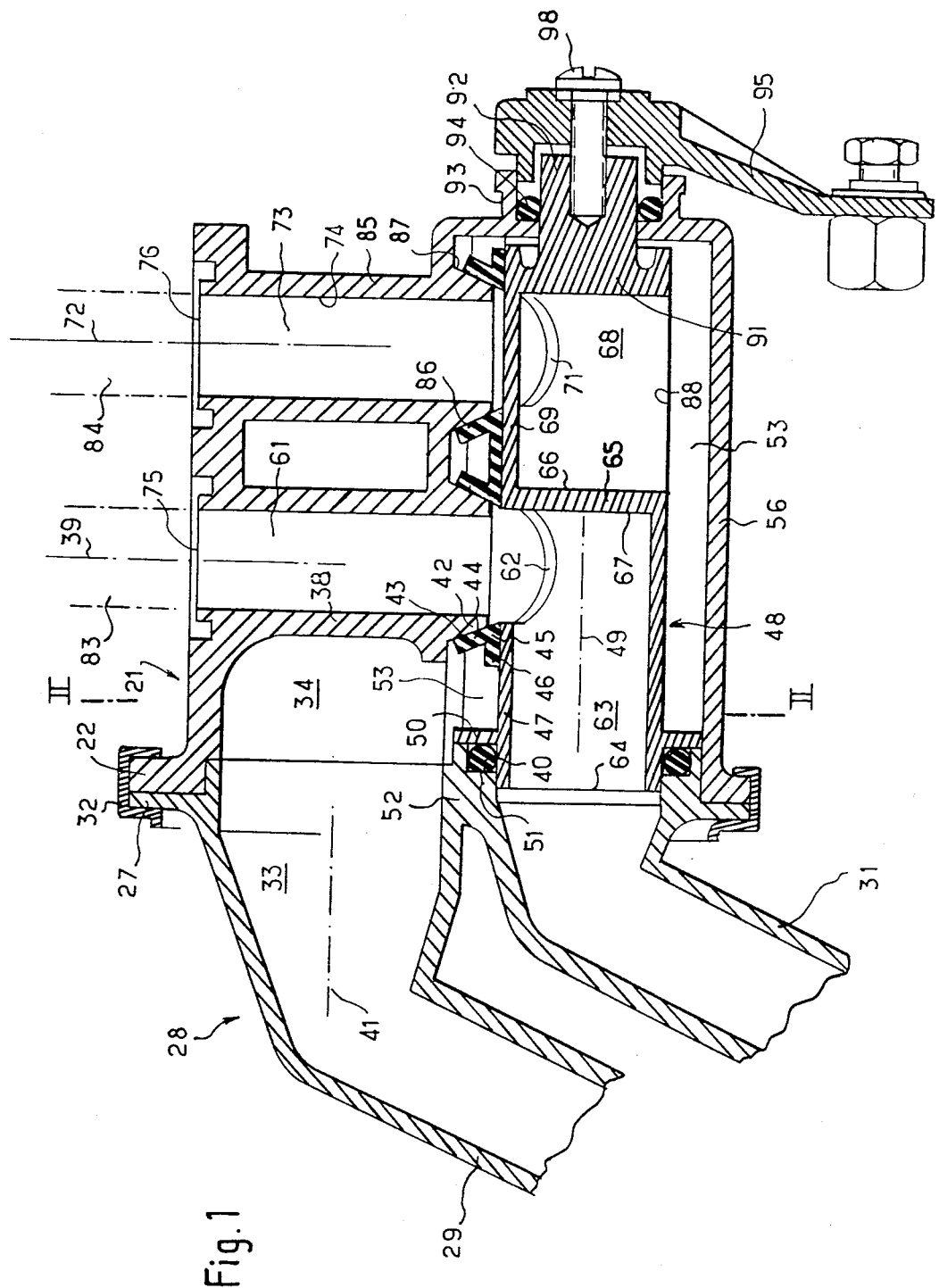

United States Patent [19]

Bouvot

[11] 4,427,057

[45] Jan. 24, 1984

[54] DEVICE FOR THE CONTROL OF THE LIQUID SUPPLY OF A HEAT EXCHANGER

[75] Inventor: Jean-Francois Bouvot, Le Mesnil Saint Denis, France

[73] Assignee: Valeo, Paris, France

[21] Appl. No.: 227,417

[22] Filed: Jan. 22, 1981

[30] Foreign Application Priority Data

Dec. 31, 1979 [FR] France ................................. 79 32103

[51] Int. Cl.³ ............................................ F28F 27/02
[52] U.S. Cl. ................................ 165/103; 137/625.24; 137/625.27; 237/123 B; 123/41.08; 123/41.09; 123/41.1; 165/135
[58] Field of Search ......................... 165/103, 135, 42; 237/12.3 B; 123/41.08, 41.09, 41.1; 137/375, 625.23, 625.24, 625.47, 625.43, 625.29; 277/27

[56] References Cited

U.S. PATENT DOCUMENTS

| | | | |
|---|---|---|---|
| 1,642,296 | 9/1927 | Brant | 237/12.3 B |
| 3,144,904 | 8/1964 | Kahn et al. | 165/132 |
| 3,227,372 | 1/1966 | Prokupek | 165/103 |
| 3,587,649 | 6/1971 | Lechler | 137/625.47 |

FOREIGN PATENT DOCUMENTS

| | | | |
|---|---|---|---|
| 2328141 | 11/1974 | Fed. Rep. of Germany | 165/103 |
| 2804722 | 8/1978 | Fed. Rep. of Germany | 237/12.3 B |
| 2758116 | 6/1979 | Fed. Rep. of Germany | 165/103 |
| 1573525 | 7/1969 | France | 237/12.3 B |
| 2276957 | 1/1976 | France | 237/12.3 B |
| 52-73434 | 6/1977 | Japan | 237/12.3 B |
| 574577 | 4/1976 | Switzerland | 165/103 |
| 347812 | 5/1931 | United Kingdom | 237/12.3 B |
| 899286 | 6/1962 | United Kingdom | 165/103 |

Primary Examiner—William R. Cline
Assistant Examiner—John F. McNally
Attorney, Agent, or Firm—R. Gale Rhodes, Jr.

[57] ABSTRACT

A cock device for controlling the operation of a heat exchanger comprises a body interposed between liquid supply and return ducts and liquid inlet and outlet ducts of the exchanger, and a plug rotatably mounted in the body, said body and said plug being made of a thermally insulating material.

6 Claims, 12 Drawing Figures

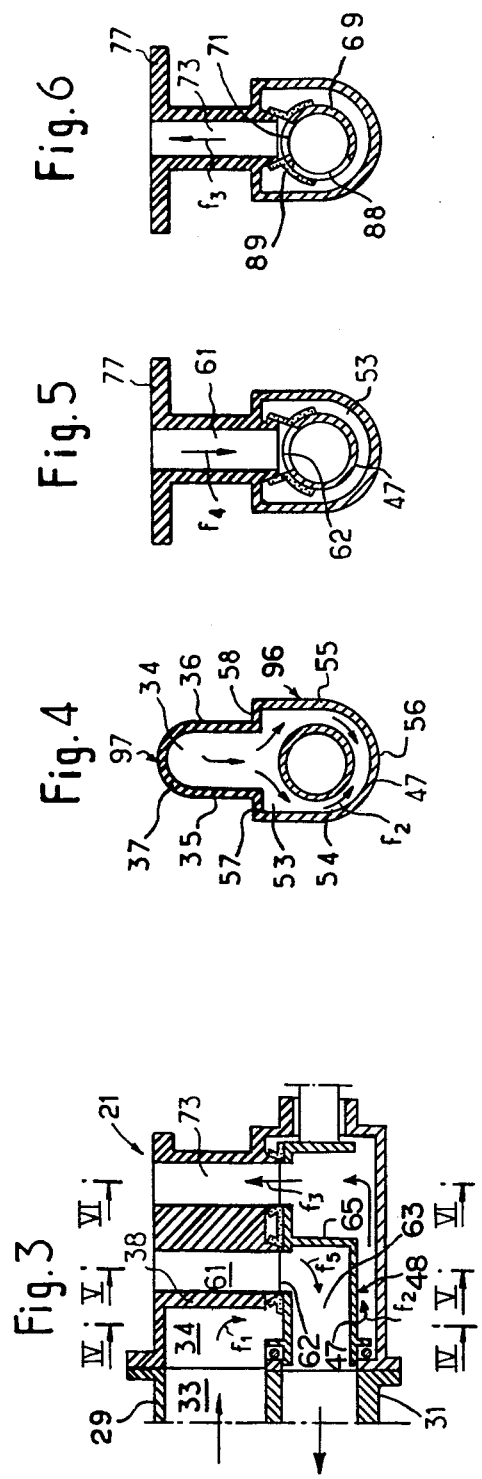

DEVICE FOR THE CONTROL OF THE LIQUID SUPPLY OF A HEAT EXCHANGER

The object of the present invention is a device for the control of the liquid supply of an apparatus, notably a heat exchanger, particularly for a motor vehicle.

Most of the time, hitherto, the operation of such an exchanger is controlled by means of a cock interposed in the liquid inlet or liquid outlet tubing.

But if the circulation of the liquid, which is most often water, can thereby be interrupted in the exchanger, the water contained in the latter is still in thermal conductivity relation with the water of the supply circuit; in the case where said circuit contains hot water, the closing of the cock does not prevent some thermal exchange to go on, giving rise to a "thermosiphon" effect and to a progressive heating of the liquid contained in the exchanger.

When the exchanger is a heating radiator of the passenger space of a motor vehicle, if follows that even when the cock is closed, the radiator goes on heating the passenger space, which is particularly undesirable when the season is hot, and in all cases contrary to what is required.

The object of the invention is a control device avoiding such a disadvantage.

According to the invention, a control device of a liquid circulation device, particularly of a heat exchange for the heating installation of the passenger space of a motor vehicle, comprises a cock interposed between liquid supply and return ducts and liquid inlet and outlet ducts of the exchanger, the cock comprising a body formed with openings or channels in which emerge said ducts and a substantially cylindrical member or plug, rotatably mounted in the body between two limit positions in one of which it allows the liquid supply to the exchanger and in the other one of which it closes each of the exchanger inlet and outlet ducts and connects the liquid supply and return ducts to each other, wherein the body and the plug of the cock are made of thermally insulating material(s).

The use of a thermally insulating material, for example a plastics material, for constituting the body and the plug of the cock, interrupts any thermal communication by conduction through the body of the cock and the materials of the exchanger between the liquid of the supply or return ducts on the one hand and the liquid contained inside the exchanger on the other hand.

Figure 2:
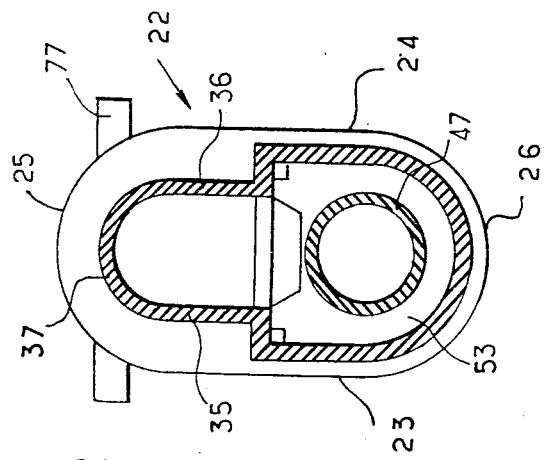
Figure 7:
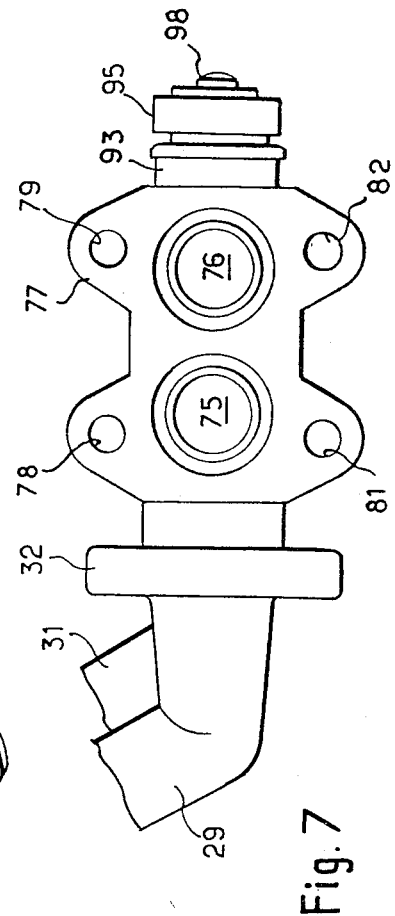
Figure 8:
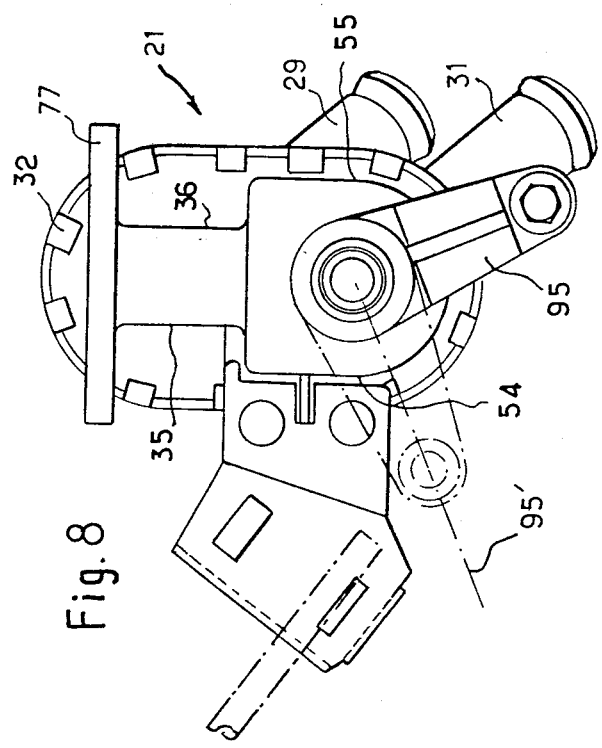

In the following description which is given by way of example, reference is made to the accompanying drawings wherein:

FIG. 1 is a longitudinal sectional view of a device according to the invention,

FIG. 2 is a transverse sectional view along line II—II of FIG. 1, but at a smaller scale, FIG. 3 is a view similar to FIG. 1, but schematic and at a smaller scale, in the open condition of the cock, FIG. 4 is a sectional view in a plane shown by line IV—IV of FIG. 3, FIG. 5 is a sectional view in a plane shown by line V—V of FIG. 3, FIG. 6 is a sectional view in a plane shown by line VI—VI of FIG. 3, FIG. 7 is a frontal view, FIG. 8 is a frontal view, but perpendicular to the previous one, FIG. 9 is a view similar to FIG. 3, but in the closed condition of the cock and for a by-pass circulation, FIG. 10 is a sectional view in a plane shown by line X—X of FIG. 9, FIG. 11 is a sectional view in a plane shown by line XI—XI of FIG. 9, FIG. 12 is a sectional view in a plane shown by line XII—XII of FIG. 9.

The device comprises a cock body 21 (FIG. 1) having at one end a flange or projection 22 the outer contour of which comprises parallel rectilinear edges 23 and 24 (FIG. 2) joined by semi-circular edges 25 and 26. Said flange is adapted for cooperating tightly, with a close fit, with a conjugated flange 27 forming the end of a supply circuit 28 comprising a supply or inlet tubing 29 and an outlet tubing 31 assembled so as to form a mechanical unit having the flange 27. The flange 22 and the flange 27 are applied onto each other under pressure by a clamping ring 32.

The inlet chamber 33 which forms the end of tubing 29 is thus facing an inlet chamber 34 (FIGS. 1 and 3), provided in body 21, bounded by two parallel walls 35 and 36 (FIGS. 2 and 4) of said body, joined by a semi-cylindrical wall 37. Moreover, chamber 34 (FIG. 1) is bounded by a wall section 38 of general cylindrical shape, having its axis 39 perpendicular to the axis 41 of chamber 33, and which extends into an end 42 having an outer frustoconical surface 43.

The surface 43 is sealingly engaged with an initially cylindrical collar 44 of a seal 45 the body 46 of which is sealingly engaged with the cylindrical wall 47 of a plug 48 rotatably mounted about an axis 49 perpendicular to axis 39. Said plug is formed on its outer face with a circular crown 50 cooperating with a sealing O-ring 40 surrounding the end of the cylindrical wall or skirt 47 and which is maintained on the other hand by a shoulder 51 formed at the connection 52 between the tubing 31 and the cock.

The chamber 34 emerges into an annular chamber 53 (FIGS. 1 and 4) bounded by two parallel walls 54 and 55 of a lower portion 96 in which is housed the plug 48 and joined by a semi-cylindrical wall 56 of the cock body, the distance between said walls 54 and 55 being larger than the distance between walls 35 and 36 bounding the upper portion 97 of the cock body 21, said walls being joined to walls 54 and 55 respectively by perpendicular walls or shoulders 57 and 58.

In an alternative embodiment, not shown, the distance between the walls 35 and 36 is substantially equal to the distance between walls 54 and 55, thereby reducing the pressure drop of the water in circulation.

The plug 48 is formed, facing the channel 61 bounded by the cylindrical wall 38, with an opening 62 which sets in communication, in the position shown in FIG. 3, said channel with the chamber 63 inside the skirt 47 of the plug 48. The chamber 63 is in permanent communication with tubing 31 through the end opening 64 of skirt 47.

The chamber 63 is bounded at its other end by a transverse wall 65 of the plug which, on its face 66 opposite face 67 which is turned towards the chamber 63, bounds a second chamber 68 jointly with a second skirt portion 69 of the plug 48. The second skirt portion 69 is formed with a first opening 71, symmetrical relative to the transverse plane (viz. perpendicular to axis 41) extending along the axis 72 of a second channel 73 formed in the cock body 21 and parallel to the first channel 61, said channel 73 being bounded by a cylindrical surface 74.

The outer ends of channels 61 and 73 constitute openings 75 and 76 (FIGS. 1 and 7) formed in a flange 77 which, through bolts extending through holes 78, 79, 81, 82, can be tightly applied against a conjugated flange (not shown) in which emerge the tubings schematically shown at 83 and 84, respectively connected to the outlet and to the inlet of a heat exchanger which, in the case of a tube and fin exchanger, as is used in the automobile construction, depend from a water box or from the two water boxes which said exchanger comprises.

The tight mounting of the plug 48, in its portion comprising the skirt 69, is provided by a collar 86, initially cylindrical depending from body 46 of seal 45. Said collar is deformed through the introduction of the frustoconical surface 87 forming the end of the cylindrical body 85 defining channel 73.

The skirt 69 is formed with another opening 88 (FIGS. 1 and 6) of greater length than opening 71 and separated from the latter by a band 89. The end of the plug which is opposite wall 65 is formed by a bottom 91 from which depends a core 92 sealingly mounted in the circular projection 93 which is part of the cock body, by virtue of the O-ring 94. To the core 92 is rigidly connected, by a screw, an actuating arm 95, thus rotatably mounted about the plug axis 49.

The operation is the following:

The condition shown in FIG. 1 and FIGS. 3 to 6 is the opened condition of the cock. The liquid arriving from tubing 29 flows into chamber 34 provided in the body 21 of the cock, circulates in the annular chamber 53 provided between the cock body and the first skirt 47, as is shown by arrows $f_1$ and $f_2$ of FIGS. 3 and 4, and reaches, through the opening 88 of the second skirt 69 of plug 48, the chamber 68 which is inside said skirt, flows through the opening 71 of the latter (FIGS. 3 and 6), circulates in channel 73 as is shown by arrow $f_3$ of FIG. 6, reaches the inlet of the heat exchanger by flowing through tubing 84, and then after having circulated in the latter, is discharged from the heat exchanger in order to reach, via tubing 83, the channel 61 as is shown by arrow $f_4$ of FIG. 5. The liquid flows through opening 62 formed in the first skirt 47, reaches the chamber 63 bounded by said skirt, as is shown by arrow $f_5$ of FIG. 3 and is discharged through opening 64 formed by said skirt in order to reach the discharge tubing 31.

During this circulation, the tightness is provided between chamber 53 and the discharge tubing 31 by an O-ring 40. The tightness between the liquid circuit arriving into the exchanger and the liquid circuit discharged from the exchanger is provided by the seal 45, made of rubber or similar, having a body 46 and sealing collars 44 and 86.

In order to put the heat exchanger out of circuit, it is enough to turn the actuating arm 95 from the position shown in solid line in FIG. 8, about 90°, for bringing it to the position shown schematically by the axis line 95'.

In this condition, which is shown in FIGS. 9 to 12, the liquid arriving from tubing 29 still reaches chamber 34 of the cock body and flows in the latter, and is shown by arrow $f_1$ of FIG. 9, then reaches the annular chamber 53 between the plug 48 and the wall of housing 96. In this position, the opening 62 opens into chamber 53, as is shown in FIG. 11, so that the liquid flows inside chamber 63 and returns to the supply circuit 28 through tubing 31. The liquid present in the annular chamber 53 fills up chamber 68 bounded by the second skirt 69 by flowing through opening 88 and opening 71 (FIG. 12), but it cannot reach the channel 73, since the skirt 69 closes said channel. The cock is in a by-pass condition establishing a direct communication between the tubing 29 and the tubing 31.

The liquid contained in the heat exchanger and which is in communication with the cock via the tubings 83 and 84 and which is present in the ducts 61 and 73 has no access to the annular chamber 53: the outlet of channel 73 is closed by the skirt 69, the tightness being ensured by the collar 86 cooperating with the frustoconical projection 87 and by the body 46 of the seal 45 cooperating with the skirt 69. The outlet of channel 61 is closed by skirt 47 and the tightness is ensured by the collar 44 cooperating with the conical projection 43 and by the body 46 of the seal 45 cooperating with the skirt 47.

The liquid contained in a circuit comprising the channel 73, the tubing 84, the exchanger, the tubing 83, the channel 61, stagnates in said circuit. It is separated, by skirt walls made of a thermally insulating material, from the liquid of the circuit comprising the tubing 29, the chamber 34, the annular chamber 53, the chamber 68. Any thermal influence of the liquid stagnating in the latter circuit on the liquid stagnating in the first circuit is thereby prevented. The heat exchanger is, in this condiction, completely inoperative, which is desired by the user who has actuated the arm 95.

I claim:

1. In a heat exchanger of the heating installation of the passenger of a motor vehicle, a device for controlling the liquid circulation into the heat exchanger and comprising a cock, said cock having a body formed with channels connected to liquid supply and return ducts of the installation and to liquid inlet and outlet ducts of the exchanger, a substantially cylindrical plug rotatably mounted in the body between a first position in which it allows the liquid supply to the exchanger and a second position in which it closes the channels connected to the liquid inlet and return ducts of the exchanger and connects the liquid supply and return ducts to each other, said body and said plug being made of a thermally insulating plastic material, said plug comprising a substantially cylindrical skirt, a transverse wall forming two chambers within the skirt and separating them from each other, said skirt being adapted to close the said channels connected to the liquid inlet and outlet ducts of the exchanger when the plug is in its second position, said skirt having two openings merging each into a said chamber and adapted to communicate with the channels connected to the liquid inlet and outlet ducts of the exchanger when the plug is in its first position, and means forming a permanent communication between one of said chambers and one of said supply and return ducts, and between the other of said chambers and the other of said supply and return ducts.

2. A device according to claim 1, wherein the body comprises a substantially cylindrical housing in which is rotatably mounted the plug, said housing forming a cylindrical annular gap about the plug, said channels connected to the heat exchanger having an end opening into said gap, and a single seal member being provided in said gap for cooperating with the skirt and ensuring a liquid-tight mounting of the plug in said housing.

3. A device according to claim 2, wherein said seal member comprises two tubular cylindrical collars and each said channel merging into said gap is formed at its end with a frustoconical projection extending into a said collar of the seal member.

4. A device according to claim 2 or 3, wherein both channels merging into said gap are parallel to each other and perpendicular to the rotation axis of the plug.

5. A device according to claim 2, wherein one of said chambers is opened at one end of the plug and communicates directly with one of the channels connected to the liquid supply and return ducts, whereas the other chamber communicates with the other of said channels by an opening formed in said skirt of the plug and by said gap.

6. A cock device for controlling the flow of heating liquid between the inlet and outlet ducts of a heat exchanger and liquid supply and return ducts of the heating installation for the passenger space of a motor vehicle, comprising: a body including an inlet chamber for connection to said liquid supply duct, outlet and inlet channels for connection to the inlet and outlet ducts of the heat exchanger, and a generally annular chamber in permanent communication with said inlet chamber; said cock further including a cylindrical plug residing in said annular chamber mounted for rotation about an axis, said plug provided with a generally centrally formed transverse wall dividing said plug into plug outlet and plug inlet chambers, said plug outlet chamber having generally axially aligned and angularly displaced inlet and outlet openings, said plug inlet chamber having an inlet opening axially displaced from and angularly aligned with said outlet opening of said plug inlet chamber, said plug inlet chamber having an open end opposite said transverse wall and said open end in permanent communication with said return duct; upon said plug being in a first angular position said outlet opening of said plug inlet chamber aligned with said inlet channel and said inlet opening of said plug inlet chamber aligned with said outlet channel and said inlet opening of said plug outlet chamber in communication with said annular chamber whereby said heat exchanger inlet duct is placed in communication with said fluid supply duct through said body inlet chamber, said annular chamber, said plug outlet chamber and said outlet channel and whereby said heat exchanger outlet duct is in communication with said return duct through said outlet channel and said plug inlet chamber; upon said plug being in a second angular position, said plug outlet and inlet openings removed from communication with said outlet and inlet channels with said plug blocking said outlet and inlet channels and said plug inlet opening of said plug inlet chamber placed in communication with said annular chamber whereby said supply duct is connected to said return duct through said body inlet chamber, said angular chamber, and through said plug inlet chamber and whereby said heat exchanger is bypassed.

* * * * *